US008532285B2

(12) United States Patent
Coughlan et al.

(10) Patent No.: US 8,532,285 B2
(45) Date of Patent: *Sep. 10, 2013

(54) METHOD AND APPARATUS FOR CALL CONTROL USING MOTION AND POSITION INFORMATION

(75) Inventors: Marc William Joseph Coughlan, Balmain (AU); Alexander Quentin Forbes, Westleigh (AU); Ciaran Gannon, Killara (AU); Rod D. Livingood, Cupertino, CA (US); Paul Roller Michaelis, Louisville, CO (US); Peter Donald Runcie, Bilgola Plateau (AU); Ralph Warta, Gladesville (AU)

(73) Assignee: Avaya Inc., Basking Ridge, NJ (US)

( * ) Notice: Subject to any disclaimer, the term of this patent is extended or adjusted under 35 U.S.C. 154(b) by 1770 days.

This patent is subject to a terminal disclaimer.

(21) Appl. No.: 11/899,338

(22) Filed: Sep. 5, 2007

(65) Prior Publication Data
US 2009/0060170 A1   Mar. 5, 2009

(51) Int. Cl.
*H04M 1/03* (2006.01)

(52) U.S. Cl.
USPC .................................. 379/433.02; 455/456.3

(58) Field of Classification Search
USPC .................... 379/188, 433.02, 52; 455/456.3, 455/569.1, 456.1; 381/56, 57, 60, 314, 315
See application file for complete search history.

(56) References Cited

U.S. PATENT DOCUMENTS

| 5,787,187 A * | 7/1998 | Bouchard et al. ............. 382/115 |
|---|---|---|
| 5,792,072 A | 8/1998 | Keefe |
| 5,868,682 A | 2/1999 | Combs |
| 5,919,143 A | 7/1999 | Jenkins et al. |
| 6,404,761 B1 * | 6/2002 | Snelling et al. ............... 370/352 |
| 6,549,792 B1 * | 4/2003 | Cannon et al. ............. 455/550.1 |

(Continued)

FOREIGN PATENT DOCUMENTS

| EP | 1670221 A1 | 6/2006 |
|---|---|---|
| JP | 8116352 A | 5/1996 |

(Continued)

OTHER PUBLICATIONS

Ping Yan, Bowyer, Kevin W., Empirical Evaluation of Advanced Ear Biometrics, Computer Vision and Pattern Recognition, 2005 IEEE Computer Society Conference on Computer Vision, Publication Date: Jun. 20-26, 2005, vol. 3, On pp. 41-41.

*Primary Examiner* — Fan Tsang
*Assistant Examiner* — Akelaw Teshale
(74) *Attorney, Agent, or Firm* — John C. Moran

(57) ABSTRACT

A method and apparatus perform call control by obtaining initial biometric information of ears of a user of a handheld audio device; detecting a change in the biometric information of the ears of the user; determining a position and motion of the handheld audio device by analyzing the detected change in biometric information; and performing call control based on the determined position and motion. Further, the method and apparatus perform a first call control operation in response to the determined motion and position if the handheld audio device is communicating with a first endpoint and a second call control operation if communicating with a second endpoint. In addition, the method and apparatus change an internal call control operation of a handheld audio device by determining motion and a position of the handheld audio device. Also, the method and apparatus control internal operations of an endpoint by determining motion and position of the handheld audio device without terminating communication with the handheld audio device wherein the endpoint is one of a voice messaging system, conferencing system, or telephone operator.

21 Claims, 12 Drawing Sheets

(56) References Cited

U.S. PATENT DOCUMENTS

| | | | |
|---|---|---|---|
| 6,591,242 B1 * | 7/2003 | Karp et al. | 705/2 |
| 6,690,954 B2 * | 2/2004 | Ushida | 455/563 |
| 6,837,857 B2 | 1/2005 | Stimemann | |
| 7,065,232 B2 | 6/2006 | Geng | |
| 7,181,192 B2 | 2/2007 | Panasik | |
| 2004/0176702 A1 | 9/2004 | Stimemann | |
| 2006/0128442 A1 * | 6/2006 | Cho | 455/569.1 |
| 2006/0140453 A1 | 6/2006 | Geng | |
| 2007/0027945 A1 | 2/2007 | McGrath | |
| 2007/0161405 A1 * | 7/2007 | Lim | 455/557 |

FOREIGN PATENT DOCUMENTS

| | | |
|---|---|---|
| JP | 200337651 A | 2/2003 |
| JP | 2006203683 A | 8/2006 |
| JP | 2007235474 A | 9/2007 |
| WO | 2007521186 A2 | 5/2007 |

* cited by examiner

FIG. 11
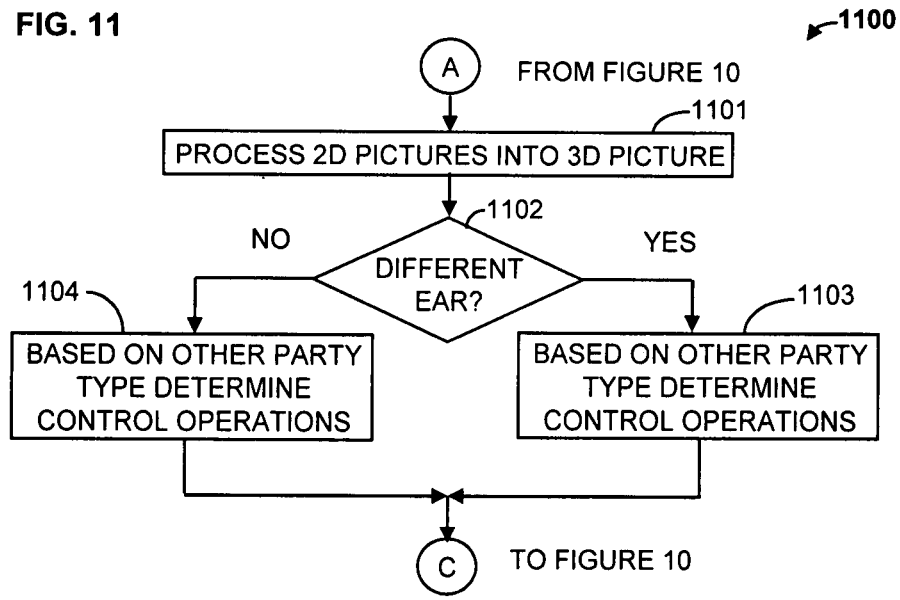
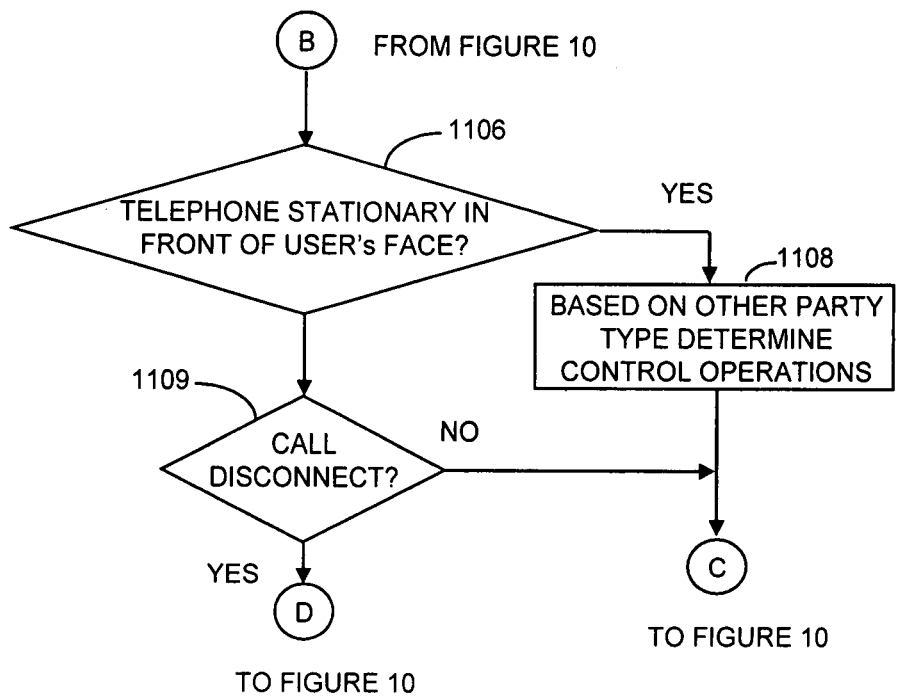

FIG. 13
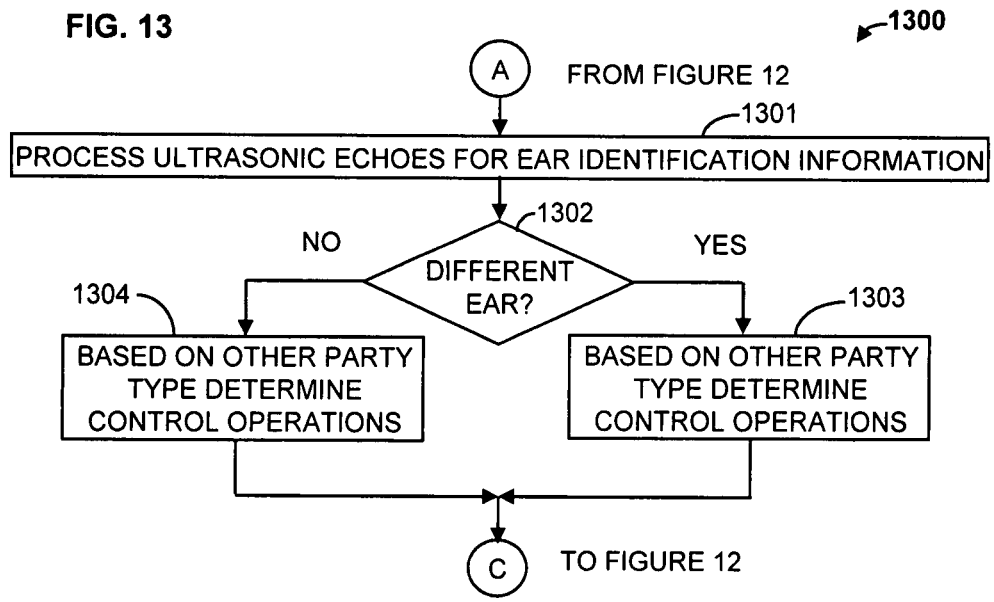
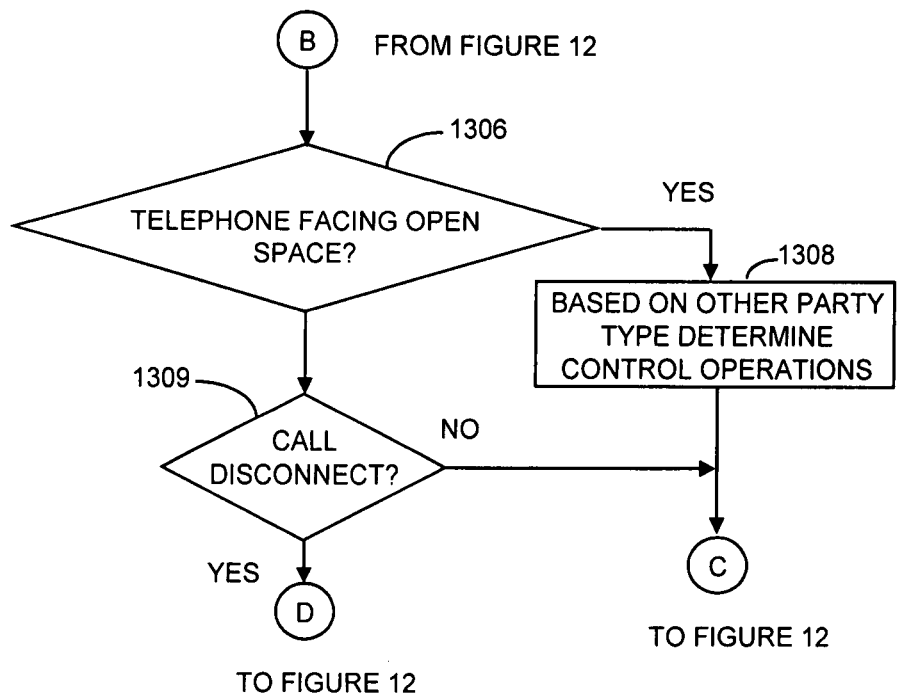

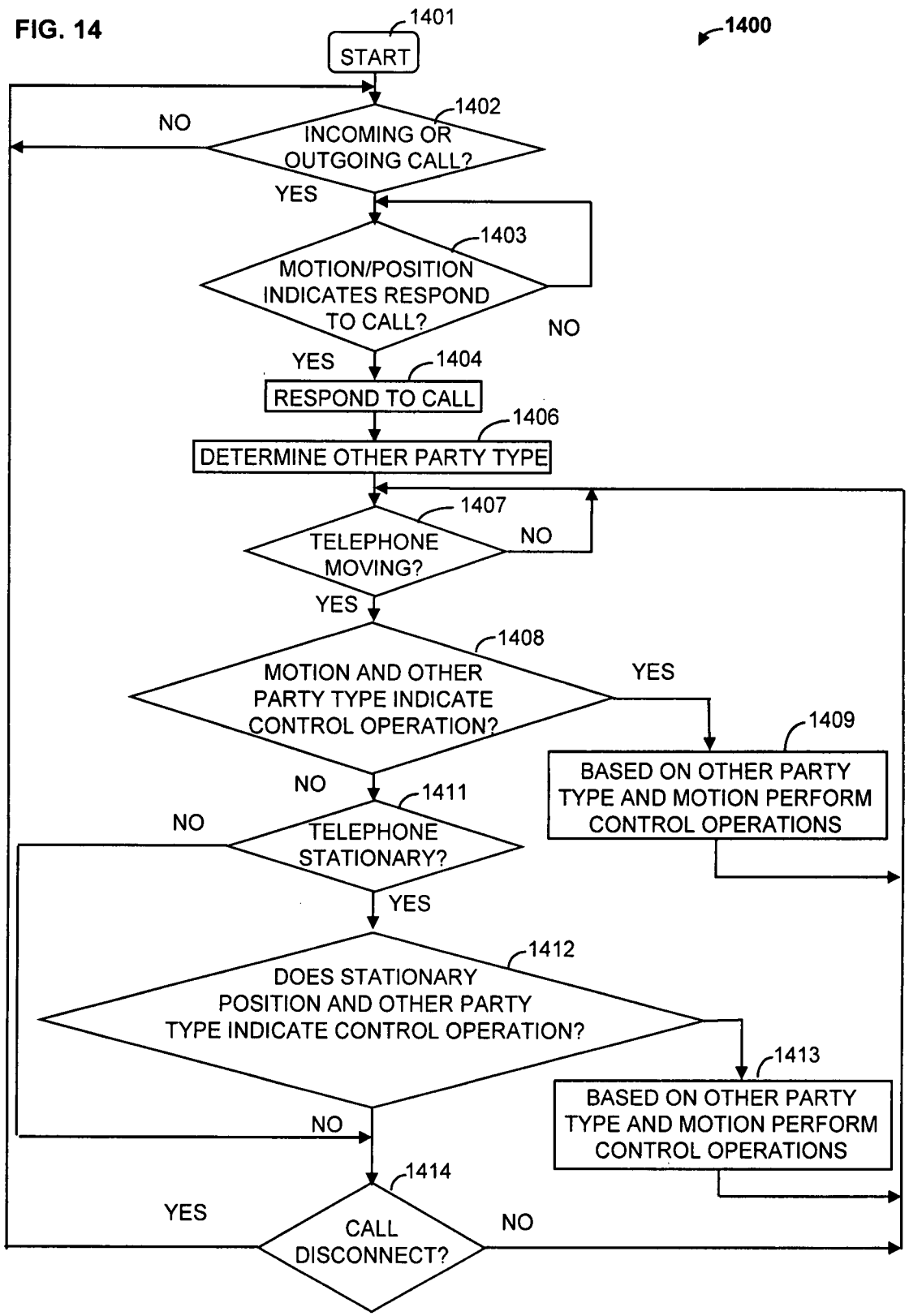

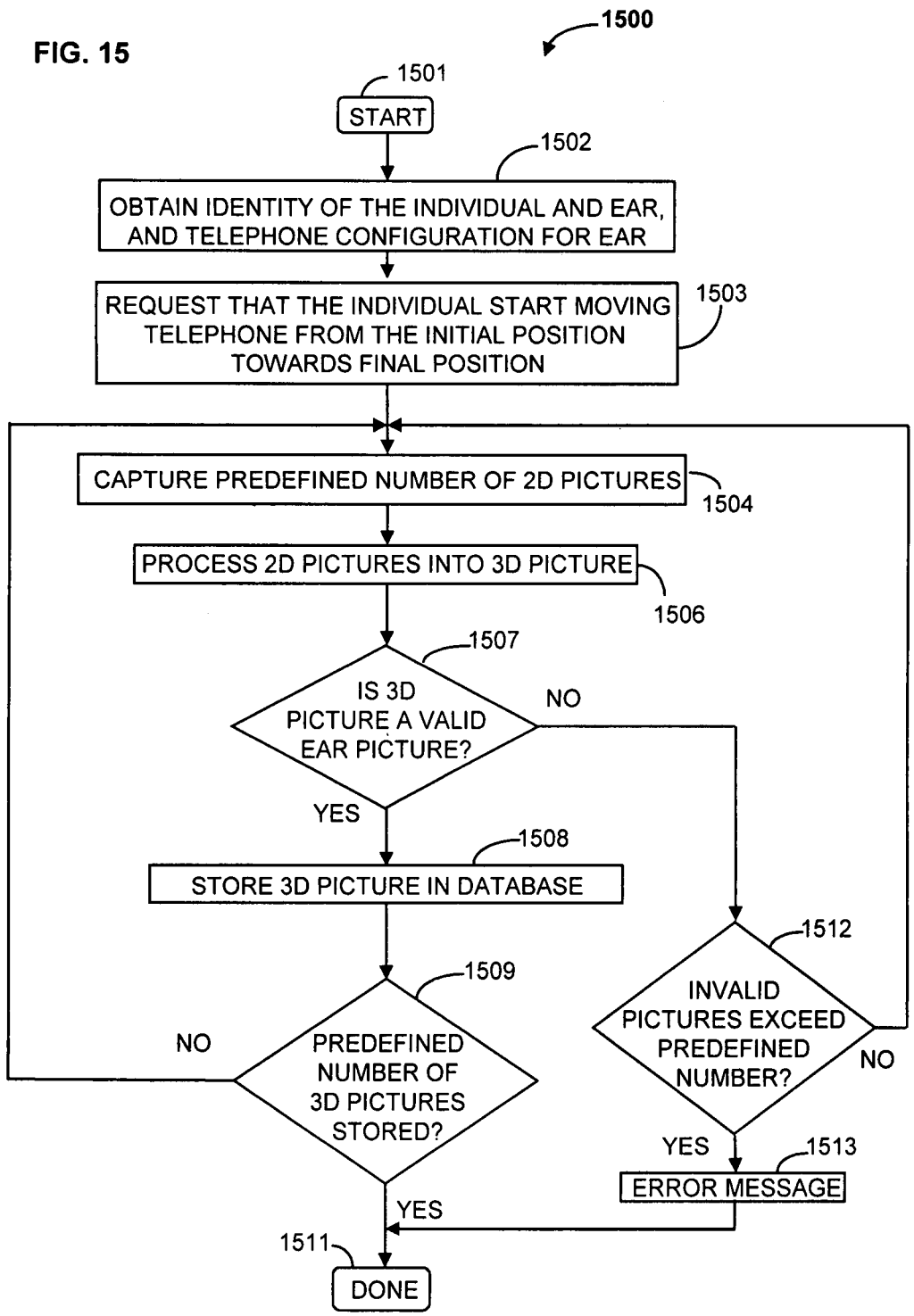

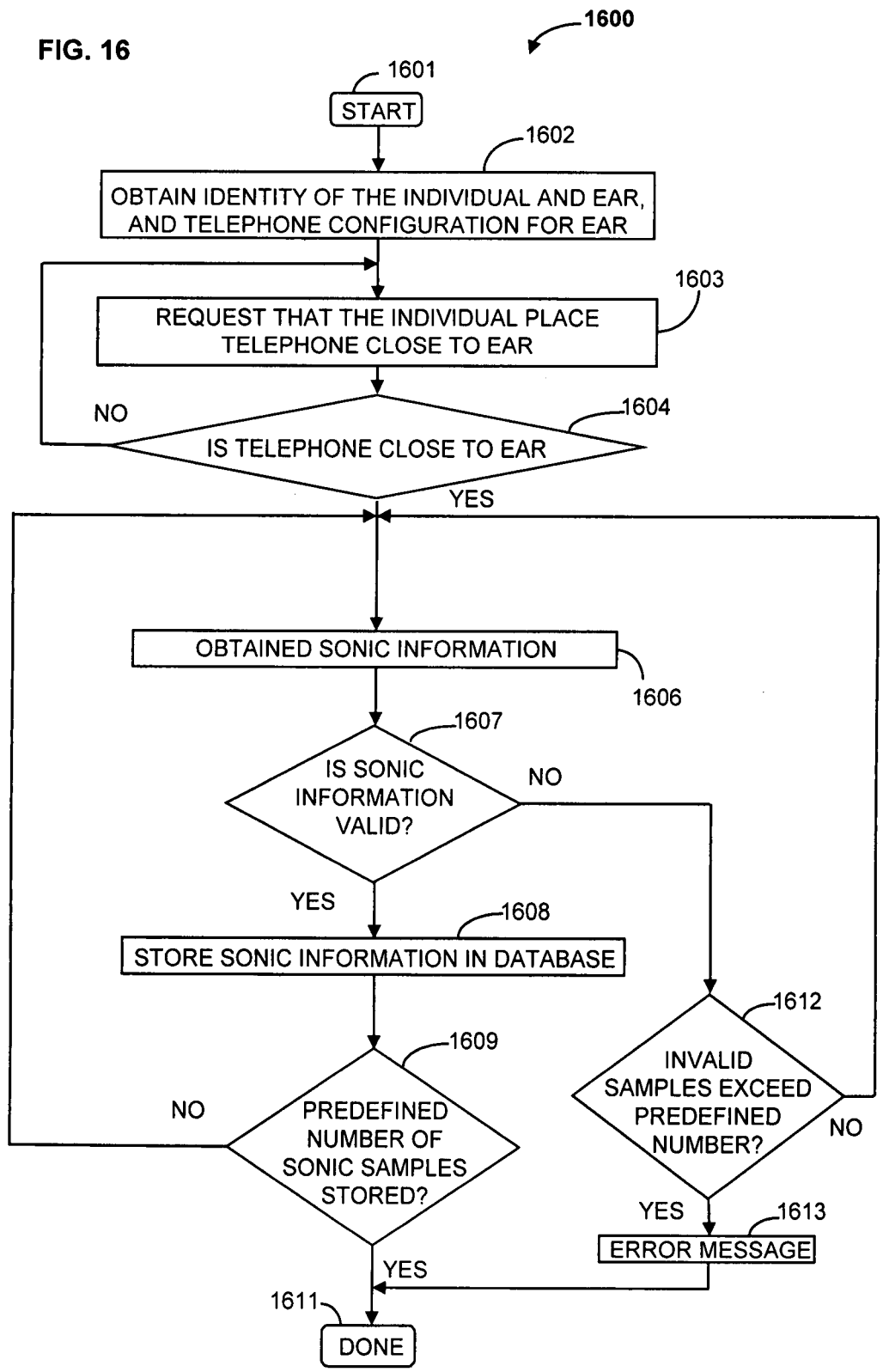

METHOD AND APPARATUS FOR CALL CONTROL USING MOTION AND POSITION INFORMATION

TECHNICAL FIELD

This invention relates to call control, and in particular, to call control based on motion and position information.

BACKGROUND OF THE INVENTION

A well-known prior art problem in the use of telephones such as mobile telephones, cellular telephones, cordless telephones, and wired telephones is performing call control such as switching from a first telephone line to a second telephone line. With respect to a wireless telephone, the problem is that the individual utilizing the wireless telephone may be walking or driving a car, and it is inconvenient to manually switch lines since the individual is involved in the other activity. Prior art telephone control required that the user take the telephone away from their ear and manually activated a button to switch telephone lines. Other call control operations that may be difficult to do while walking, driving, or other such activities are to switch between the use of speaker phone and conventional telephone use, answering an incoming call, call termination, or placing a call on hold.

SUMMARY OF THE INVENTION

A method and apparatus perform call control by obtaining initial biometric information of ears of a user of a handheld audio device; detecting a change in the biometric information of the ears of the user; determining a position and motion of the handheld audio device by analyzing the detected change in biometric information; and performing call control based on the determined position and motion.

The method and apparatus further perform call control by determining motion of a handheld audio device; determining a position of the handheld audio device; performing a first call control operation in response to the determined motion and position if the handheld audio device is communicating with a first one of a plurality of endpoints; and performing a second call control operation in response to the determined motion and position if the handheld audio device is communicating with a second one of a plurality of endpoints.

The method and apparatus further change an internal call control operations of a handheld audio device by determining motion of the handheld audio device; determining a position of the handheld audio device; and performing in response to determined motion and position an operation to change the internal call control operations of the handheld audio device.

The method and apparatus control further internal operations of an endpoint by determining motion of a handheld audio device; determining a position of the handheld audio device; and transmitting a message to the endpoint by the handheld audio device in response to the determined motion and determined position wherein the message requests an internal operation be performed by the endpoint without terminating communication with the handheld audio device wherein the endpoint is one of a voice messaging system, conferencing system, or telephone operator.

BRIEF DESCRIPTION OF THE DRAWING

FIGS. 10 and 11, illustrate in flowchart form, operations 1000 and 1100 for implementing the visual techniques;

FIGS. 12 and 13, illustrate in flowchart form, operations 1200 and 1300 for implementing the sonic techniques;

FIG. 14, illustrates in flowchart form, operations 1400 for implementing the use of gyroscopes, position detectors, accelerators, and/or contact sensors to determine motion and position information;

FIG. 15 illustrates, in flowchart form, operations 1500 that are performed by an embodiment to train a telephone for utilization of the visual technique for ear identification; and FIG. 16 illustrates, in flowchart form, operations 1600 that are performed by an embodiment to train a telephone for utilization of the sonic techniques for ear identification.

DETAILED DESCRIPTION

Figure 1:
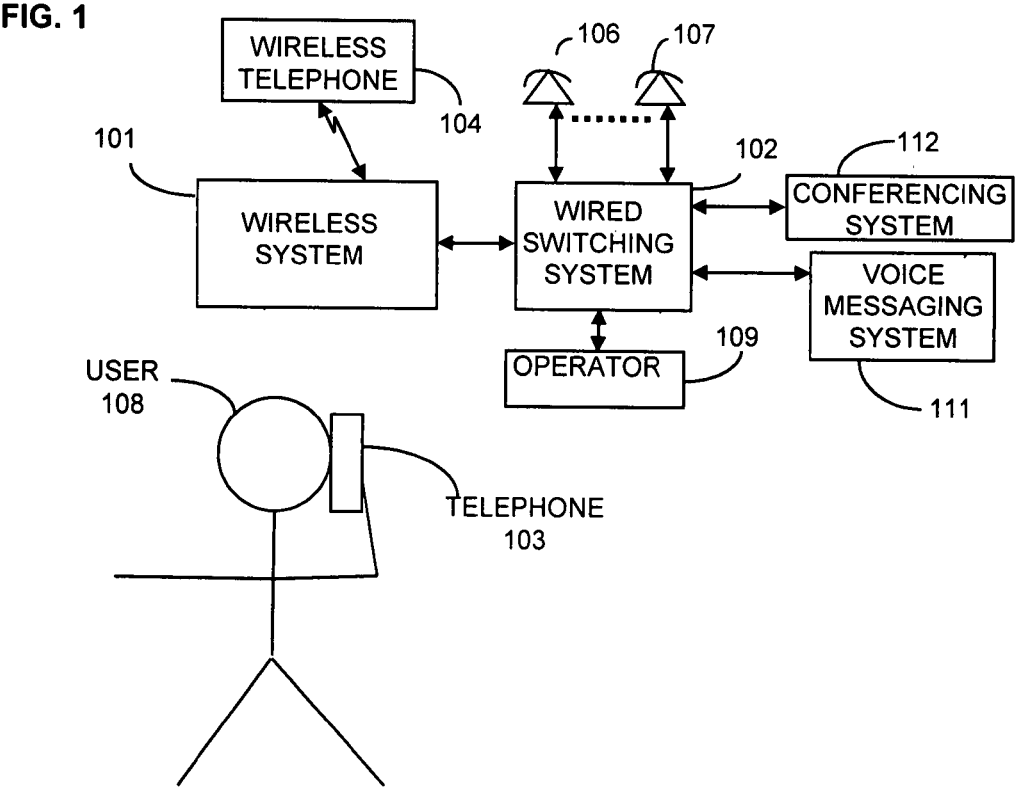
FIGS. 1-4 illustrate embodiments detecting call control operations.

One embodiment performs call control operations based on the motion and position of a telephone with respect to a user's ears or body. The telephone may be a wired telephone or a wireless telephone such as a mobile telephone, cellular telephone, a cordless telephone, or a handheld multi-functional communication device such as a personal digital assistant (PDA). In addition, the telephone is capable of using various media such as but not limited to video and audio. The wired telephone may be connected to a wired telecommunication switching system such as the Public Telephone Switching Network or a private telephone exchange by a physical wire or may utilize a connection via a data switching network such as the Internet.

In an embodiment where the user is engaged in a conversation on a first telephone line and a call is incoming on a second telephone call, the telephone is responsive to the user moving the telephone from one ear to another ear to place the call on the first line on hold and select the incoming call on the second telephone line so that the user can answer this incoming call. Further, the embodiment is responsive to the user moving the telephone back to the original ear to place the incoming call on the second telephone line on hold and select the call on the first telephone line. In one embodiment, the telephone utilizes visual techniques to recognize the ears. In another embodiment, the telephone utilizes sonic techniques to recognize the ears. The visual and sonic techniques for recognizing an ear gather biometric information about the ear. In yet another embodiment, the telephone utilizes motion/position detection to recognize movement from one ear to the other ear. The embodiment utilizing motion/position detection may use gyroscopes. Further, the telephone may use a combination of the visual, audio, or motion detection techniques to perform the detection. Note, that one skilled in the art would recognize that the use of the term "telephone line" is used to describe the fact that a telephone may be the destination for more than one active or incoming call at a time and does not denote a physical telephone line.

In another embodiment, the telephone will place a call on hold when the telephone detects that the telephone has been moved away from an ear of the user. When the telephone detects that the telephone has been moved back to the ear or the other ear, the telephone will remove the hold condition and possibly change from a first to a second active line. This detection may utilize the visual, audio, or motion detection techniques as set forth in the previous paragraph.

In another embodiment, the telephone will switch to speakerphone mode when the telephone detects that it has been placed in a particular position to the ears or body of the user. The telephone will switch from speakerphone mode when the telephone is placed near to an ear of the user. This detection may utilize the visual, audio, or motion detection techniques as set forth in the previous paragraphs.

In another embodiment, movement/position of the telephone can be utilized to control a voice mail system or a conferencing system.

In another embodiment, movement/position of the telephone can be utilized to recall an operator to and active call.

FIGS. 1-4 illustrate further details of these embodiments and the telephone positions shown are for illustrative purposes only. One skilled in the art could readily envision other positions that could be utilized to perform the same control activities. Telephone 103 can be connected to system 101 or 102. Wired switching system 102 may be a Public Telephone Switching Network (PTSN) or a private wired switching system. In addition, telephone 103 can utilize the operations provided by operator 109, voice messaging system 111, and conferencing system 112. Operator 109, voice messaging system 111, and conferencing system 112 are illustrated as being connected to wired switching system 102; however, it is well known in the art for such systems to also be part of or connected to wireless system 101.

Figure 2:
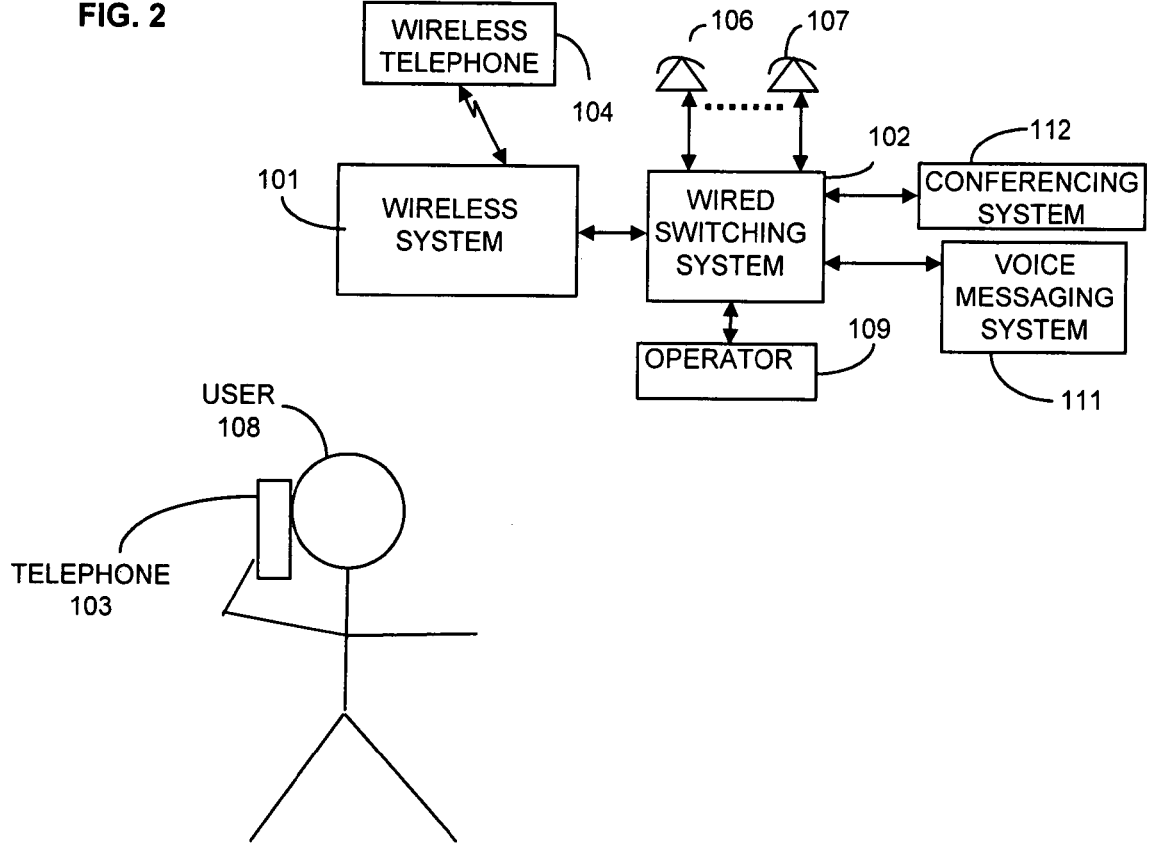

FIGS. 1 and 2 illustrates the embodiment where user 108 using telephone 103 is engaged in a conversation on a first telephone line from wireless system 101 or wired system 102 with telephone 104 or telephones 106-107 via wireless system 101 and wired switching system 102. Note, that one skilled in the art would recognize that the use of the term "telephone line" is used to describe the fact that telephone 103 may be the destination for more than one active call at a time and does not denote a physical telephone line. When wireless system 101 or wired system 102 directs another incoming call to telephone 103, telephone 103 alerts user 108 using conventional techniques well known to those skilled in the art. To place the first telephone call on hold and answer the incoming call, the user transfers telephone 103 to the other ear as is illustrated in FIG. 2. Upon detecting that telephone 103 has been placed in proximity to the other ear, telephone 103 will place the first telephone call on hold and allow the user to answer the incoming call. If the user should transfer telephone 103 back to the position illustrated in FIG. 1, telephone 103 will place the incoming call on hold and make the first telephone call active on telephone 103. Note, that this operation can be utilized even after the incoming call has been answered and is an active call.

Figure 3:
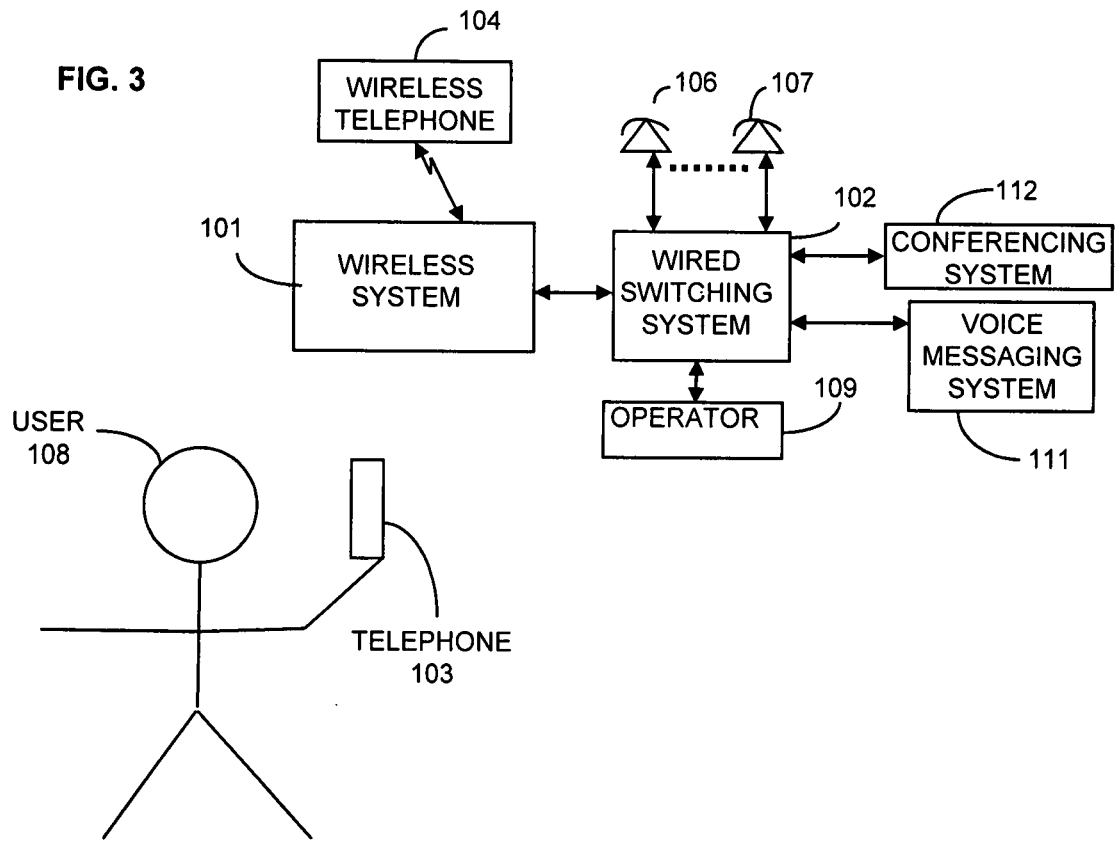

FIGS. 1 and 3 together illustrate the call operation where user 108 is engaged in a telephone conversation on telephone 103 and wishes to place the telephone conversation on hold. For example, the user may wish to speak directly to another individual who is with the user. To place the telephone conversation on holds the user moves telephone 103 away from their ear as is illustrated in FIG. 3. One skilled in the art would realize that telephone 103 could be placed in a variety of positions with respect to the user's ear. When user 108 wishes to make the telephone conversation active again, user 108 places telephone 103 in proximity to the user's ear as is illustrated in FIG. 1. In response to this position of telephone 103, telephone 103 makes the telephone call active. User 108 can also make the telephone conversation active again by placing telephone 103 in proximity to the user's other ear.

Figure 4:
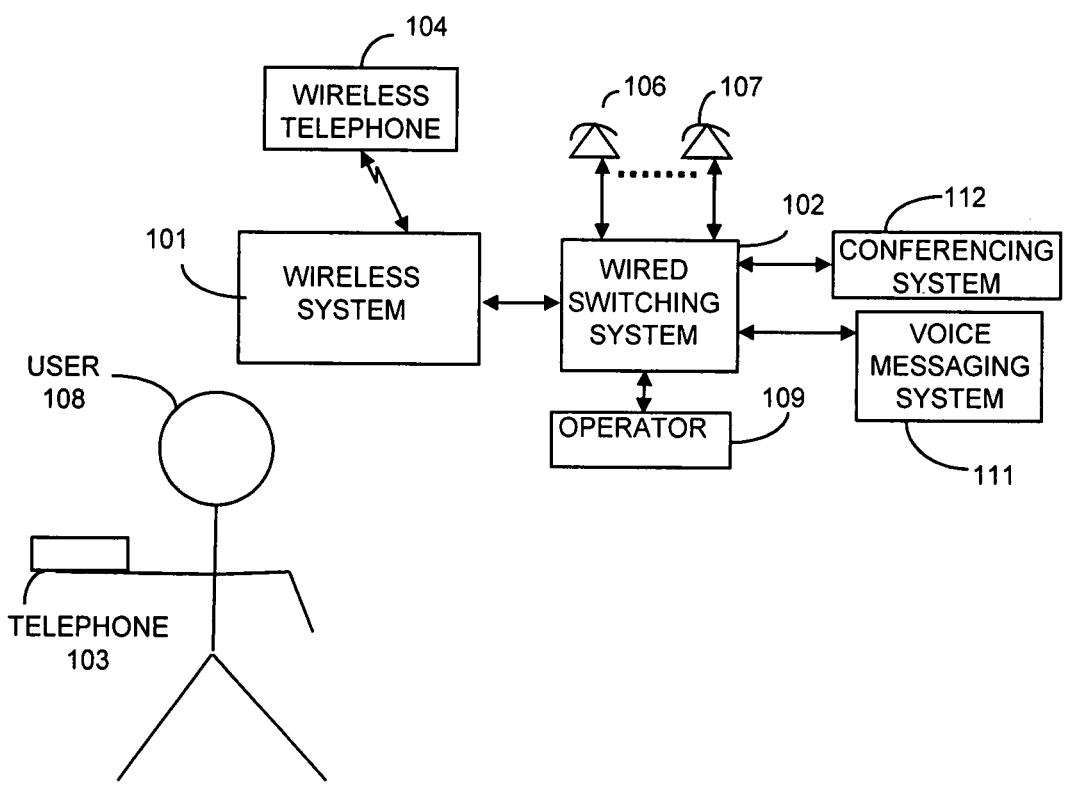

FIGS. 1 and 4 illustrate the call control operations where user 108 wishes to place an active call on speakerphone. User 108 does this by removing telephone 103 from the ear of the user and placing it in a predetermined position such as the horizontal position illustrated in FIG. 4. (One skilled in the art would realize that telephone 103 could be placed in a variety of positions with respect to the user's ear.) Upon detecting that telephone 103 is now in the horizontal position or other predetermined position, telephone 103 will start the speakerphone operation. If telephone 103 is moved by user 108 back to the position illustrated in FIG. 1, telephone 103 will stop the speakerphone operation. The speakerphone operation will cease if user 108 places telephone 103 in proximity to either ear. Note, that FIGS. 1 and 4 can also illustrate the situation where a user is answering an incoming call or terminating a call depending on the acceleration and deceleration of the telephone and whether the telephone is moving from FIG. 1 to FIG. 4 or vice versa.

Consider now telephone 103 controlling operator 109. User 108 can recall the operator to an active call from the position of telephone 103 of FIG. 1 by, for example, moving telephone 103 back-and-forth to the ear from the position illustrated in FIG. 3. The movement of telephone 103 in this manner would cause telephone 103 to send the equivalent of a flash-hook or a button press to wired switching system 102 indicating that the operator should be recalled to the active call. One skilled in the art could envision a number of motions of telephone 103 to perform this function.

Consider now telephone 103 controlling voice messaging system 111. If user 108 is retrieving messages from voice messaging system 111 using a telephone 103 as shown in FIG. 1, user 108 can respond to a message by placing a call to the caller by moving telephone 103 to the other ear as illustrated in FIG. 2. If user 108 wishes to delete a message, the user would move telephone 103 to the position illustrated in FIG. 3 and move the telephone up and down in the vertical direction. Telephone 103 would be responsive to this movement to transmit the appropriate command to voice messaging system 111 to cause this system to delete the message. If the user 108 wishes to save the message, the user would move telephone 103 to the position illustrated in FIG. 3 and move the telephone in the horizontal direction. Telephone 103 is responsive to this movement to send the appropriate command to voice messaging system 111 to cause this system to save the message. One skilled in the art could readily envision a number of different motions and movements to accomplish various functions of controlling voice messaging system 111.

Consider now how telephone 103 could control conferencing system 112 during a conference. If telephone 103 is in a sub-conference as well as a main conference, while in the main conference with telephone 103 in the position illustrated in FIG. 1, the user 108 can transfer from the main conference to the sub-conference by moving telephone 103 to the position illustrated in FIG. 2. Also, user 108 can rejoin the main conference by moving telephone 103 back to the position illustrated in FIG. 1. One skilled in the art could readily envision a number of different motions and movements to accomplish various functions of controlling conferencing system 112.

Figure 5:
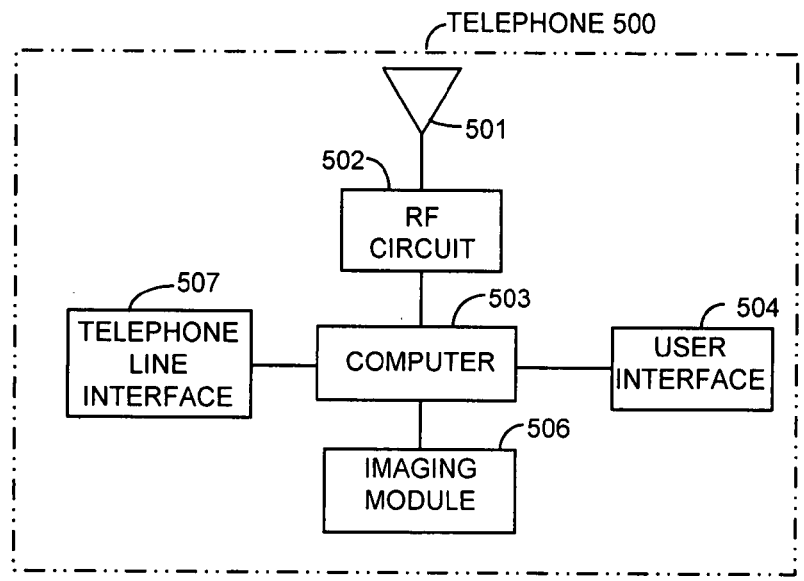
FIG. 5 illustrates, in block diagram form, an embodiment of a telephone that utilizes visual techniques for determining motion and position information.

FIG. 5 illustrates, in block diagram form, a telephone that utilizes visual techniques for determining ear information. Computer 503, which is shown in greater detail in FIG. 9, controls the operations of the telephone. If the telephone is a wireless telephone, it has blocks 701 and 702; but if the telephone is a wired telephone, it has block 707. If a wireless telephone, computer 503 controls RF circuit 502 for the transmission and reception of wireless signals both for audio information and control information. RF circuit 502 transmits and receives RF signals via antenna 501. If the telephone is a wired telephone, computer 703 controls telephone line interface 707. User interface 504 provides the functions of receiving audio information from the user, transmitting audio information to the user, providing visual information to the user and receiving key and button actuation information from the user. User interface 504 is under control of computer 503. Imaging module 508 allows computer 503 to receive visual information.

Imaging module 508 includes but is not limited to lenses, lenses focusing mechanism, image capturing circuitry, and a light source for illuminating ears. Computer 503 processes the raw image information received from imaging module 508 into usable visual information and performs the analysis necessary to identify ears. By utilizing digital camera techniques well known to those skilled in the art, computer 503 can use imaging module 508 to determine movement and acceleration by examining a sequence of pictures.

In operation, computer 503 utilizes imaging module 506 in the following manner to identify to which ear of the user the wireless camera has been placed in proximity. When computer 503 detects that the telephone is in motion, computer 503 instructs imaging module 506 to take a sequence of pictures which are 2D images. Computer 503 will also monitor the amount of light available and enabled the light source of imaging module 506 if necessary. Computer 503 also controls the focusing of the lenses of imaging module 506. Computer 503 then generates 3D images from the 2D images being gathered from imaging module 506.

Computer 503 may then utilizes an ear identification database that contains ear identification information of the individuals who have trained the telephone to recognize their ears. Based on the information obtained from the ear identification database, computer 503 can identify which ear (left or right) and also many identity of the individual whose ear it is. Note, the ear identification database may only contain information for one or two ears if only one person is intended to use the telephone. Also, an ear identification database may not be used at all; rather, the system will only use real-time information to determine the difference between two ears of any user. The operations of generating the 3D images from the 2D images and obtaining identification from an ear identification database with the 3D images is described in U.S. Pat. No. 7,065,232 and U.S. Patent Application No. 2006/0140453 both of which are hereby incorporated by reference. The databases set forth in the above incorporated patent and patent application are replaced by the ear identification database that is assembled by training the telephone for specified individuals.

Figure 6:
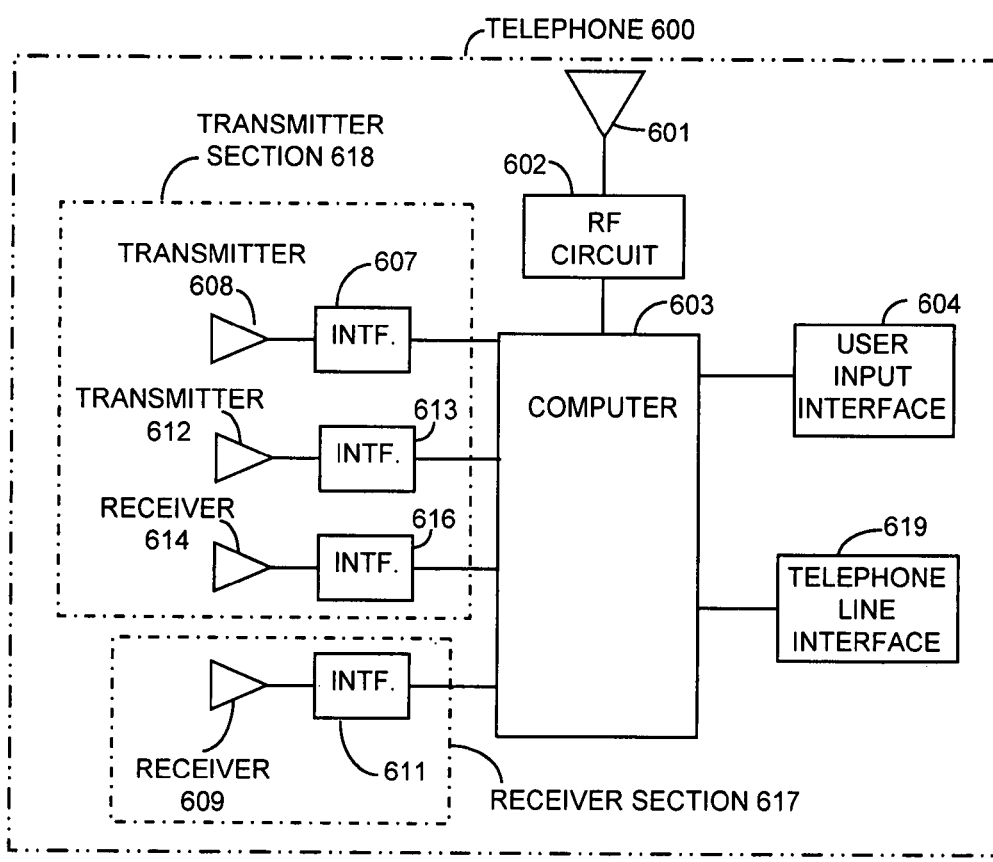
FIG. 6 illustrates, in block diagram form, an embodiment of a telephone that utilizes sonic techniques for determining motion and position information.

FIG. 6 illustrates, in block diagram form, a telephone that utilizes sonic techniques for determining ear information. Blocks 601, 602 and 619 provide the same functions as described for blocks 501, 502, and 507 of FIG. 5 but under control of computer 603 which is shown in greater detail in FIG. 9. User input interface 604 provides the same functions as user interface 504 of FIG. 5 with the exception that it does not receive or transmit audio information to the user.

Transmitter section 618 comprises the physical part of the telephone that the user associates with the transmitter of the telephone, and receiver section 617 comprises the physical part of the telephone that the user associates with the receiver of the telephone. Computer 603 uses transmitter 608 and interface 607 of transmitter section 618 to transmit voice information and other audible signals to the user. However, computer 603 also utilizes transmitter 612 and interface 613 of transmitter section 618 to transmit ultrasonic frequencies to the ear of the user for the determination of resonant frequencies of the ear of the user. Computer 603 uses receiver 614 and interface 616 of transmitter section 618 to receive the information returned by the ear of the user in response to the ultrasonic frequencies so as to determine the resonant frequencies of the ear of the user. Computer 603 uses receiver 609 and interface 611 of receiver section 617 to received voice information from the user.

When there is an active call on the telephone, computer 603 uses transmitter 612 and interface 613 to produce signals whose frequencies are in the ultrasonic range which may be within the range of 20 kHz to 60 kHz but is not limited to this particular range and one skilled in the art could readily envision utilizing a range of other frequencies. The ear canal of the user is responsive to these frequencies to resonate at different ones of the frequencies. Receiver 614 and interface 616 receive the echoes that are coming back from the ear, and computer 603 utilizes the echoes to determine the frequencies at which the ear canal is resonant or non-resonant (180° out of phase with a given frequency). Computer 603 may then utilizes an ear identification database to determine the ear (left or right) and may also identify the user using this resonance information. The ear identification database is established by all of the users who will utilize the telephone, training the telephone with respect to their ears. Also, an ear identification database may not be used at all; rather, the system will only use real-time information to determine the difference between two ears of any user. The resonance information also allows the telephone to detect when the telephone is moved near or away from a user's ear.

Figure 7:
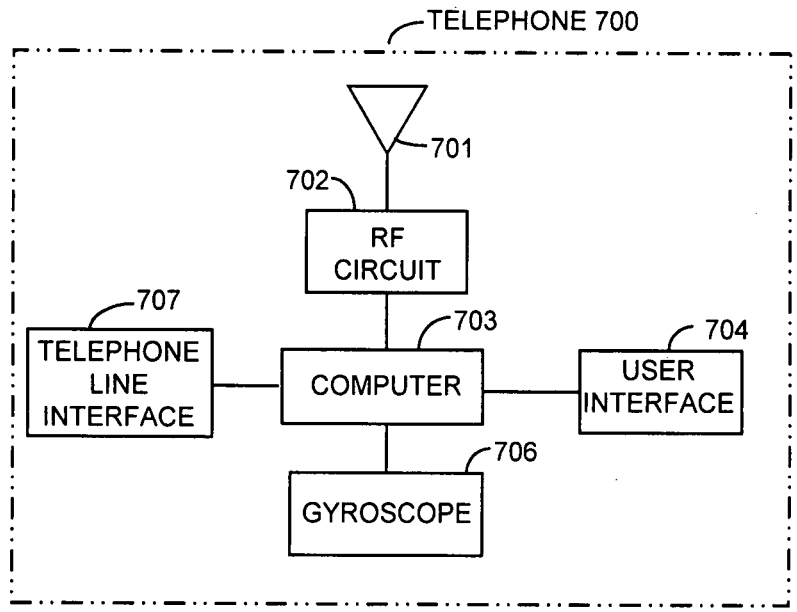
FIG. 7 illustrates, in block diagram form, an embodiment of a telephone that utilizes a gyroscope for determining motion and position information.

FIG. 7 illustrates, in block diagram form, a telephone that utilizes an acoustic or other type gyroscope for determining the relative position of the telephone to the ears of a user and also to determine the position of the telephone to the horizontal plane. The operation of an acoustic gyroscope in a telephone is described in detail in U.S. Pat. No. 6,792,381 which is hereby incorporated by reference. Computer 703 analyzes the position information received from gyroscope 706 to determine the position of the telephone with respect to the user's ears. Computer 703 is illustrated in greater detail in FIG. 9. Blocks 701, 702, 704, and 707 under control of computer 703 perform similar functions to those performed by blocks 501, 502, 504, and 507 of FIG. 5.

Computer 703 utilizes gyroscope 706 to determine the position of the telephone relative to the ears of the user by performing the following operations. Since gyroscope 706 provides the position of the telephone in space, computer 703 can determine when the telephone is moved from one ear to the other ear of the user by comparing the positions of the telephone. The call control operations for placing a call on hold and the initiating speakerphone operation can also be performed by computer 703 utilizing the position information received from gyroscope 706. Gyroscope 706 will also provide computer 703 with information necessary to determine when a user is indicating a call pickup or a call termination operation. If the user is in motion such as walking or riding in a car, computer 703 will factor the acceleration of such motion out of its calculations for purposes of performing the call control operations.

Figure 8:
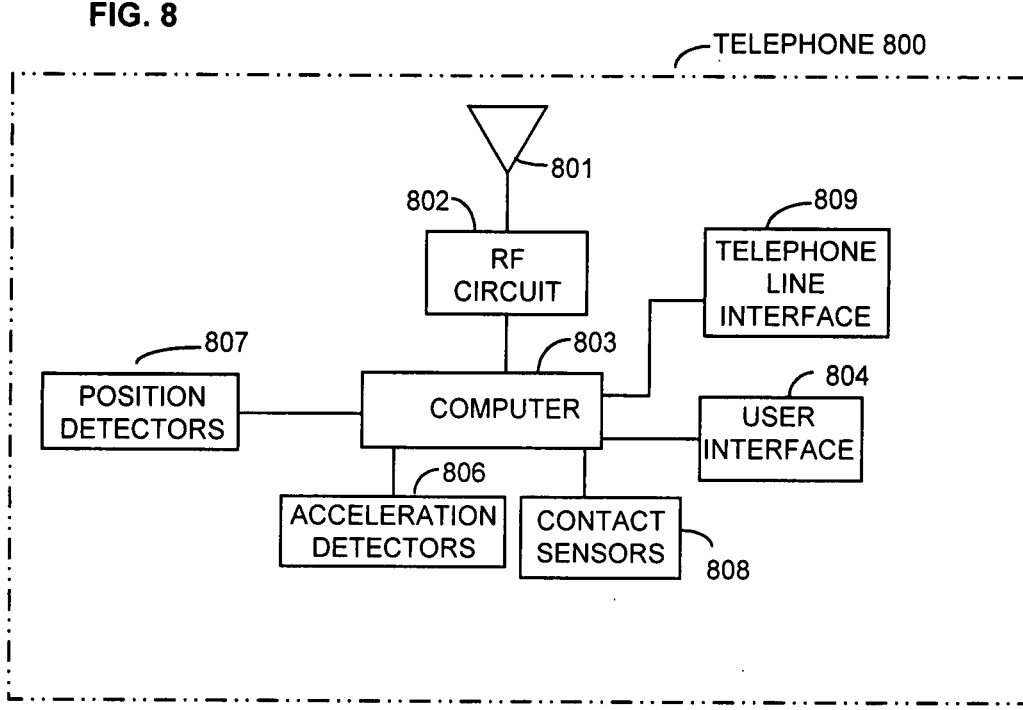
FIG. 8 illustrates, in block diagram form, an embodiment of a telephone that utilizes position detectors, accelerators, and/or contact sensors to determine motion and position information.

FIG. 8 illustrates, in block diagram form, a telephone that utilizes position detectors, acceleration detectors, and/or contact sensors to determine the telephone's position with respect to the ears of a user. Blocks 801, 802, 804, and 809 under the control of computer 803 perform the same functions as performed by blocks 501, 502, 504, and 507 of FIG. 5. Computer 803 is shown in greater detail in FIG. 9. Position detectors 807 determine the static position of the telephone to the horizontal and vertical planes, such position detectors are well known to those skilled in the art. Acceleration detectors 806 provide information about the acceleration of the telephone in all three axes. Acceleration detectors 806 can be a variety of commercial products such as ADXL330 which is manufactured by Analog Devices Inc. Contact sensors 808 provide information on whether the face of the telephone that would normally make contact with a user's ear is in contact with an object. Contact sensors 808 may utilize a heat sensor to detect the user's ear or other techniques well known to those skilled in the art. Acceleration detectors, position detectors, and contact sensors are well known to those skilled in the art.

Computer 803 utilizes detectors 806-808 to determine the position of the telephone relative to the ears of the user by performing the following operations. To determine that the telephone has been moved from one ear to another ear of a user, computer 803 first utilizes contact sensors 808 to determine that the telephone is no longer in contact with an ear and then determines from acceleration detectors 806 that the acceleration of the telephone in the three axes has been such to place it to the other ear. Finally, computer 803 utilizes contact sensors 808 to determine when the telephone makes contact with the other ear.

Computer 803 utilizes contact sensors 808 and acceleration detectors 806 to determine when the telephone has been removed from the ear of a user so as to place a call on hold by detecting acceleration by utilizing acceleration detectors 806 away from the ear and the loss of contact with the ear by utilizing contact sensors 808. Similar operations would be performed when the user places the telephone back against their ear.

Computer 803 utilizes position detectors 807 to determine when the telephone has been moved into the predefined position for starting speakerphone operation. Computer 803 utilizes acceleration detectors 806 and position detectors 807 to answer an incoming call and to terminate an active call.

Figure 9:
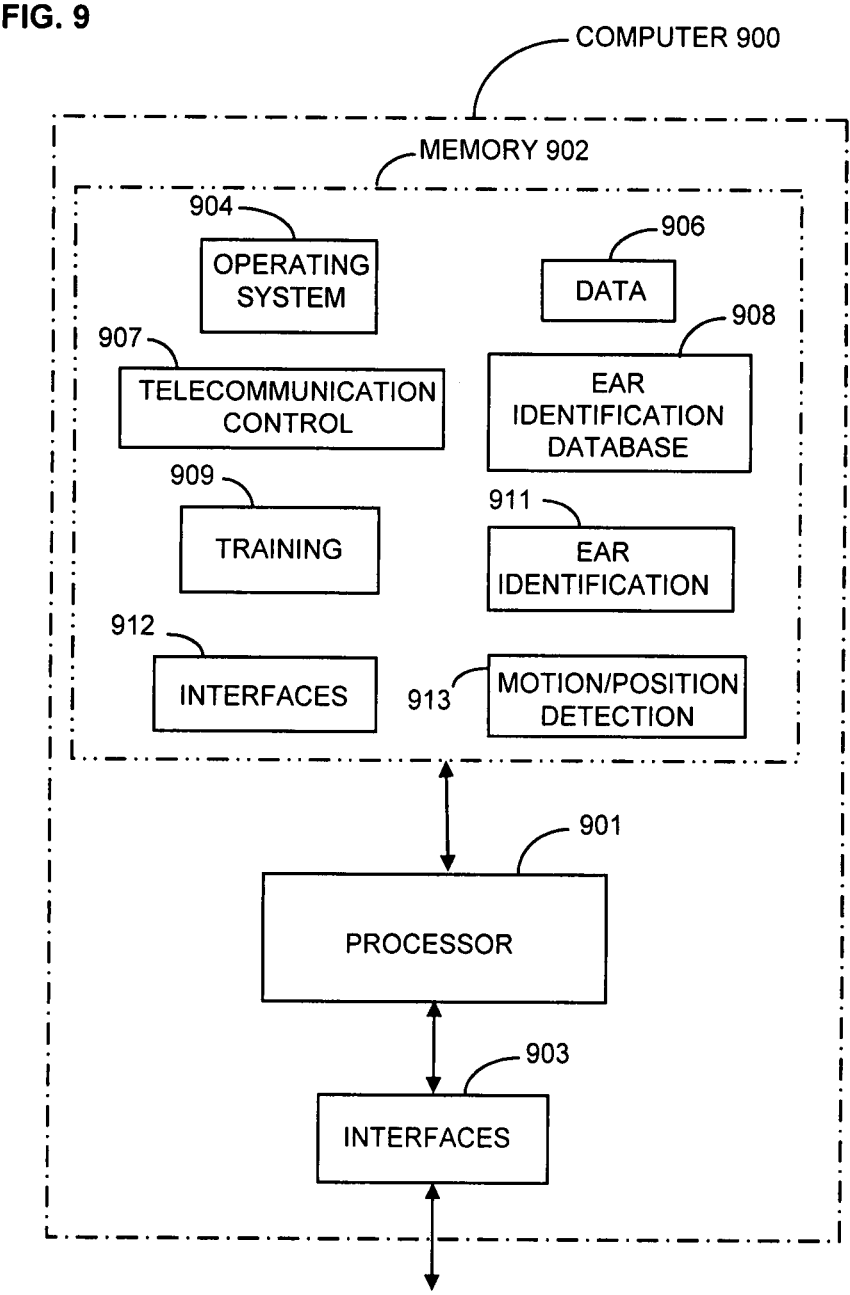
FIG. 9 illustrates, in block diagram form, a computer that may be utilized in FIGS. 5-8.

FIG. 9 illustrates, in block diagram form, computer 900 which may be computers 503, 603, 703, and 803 of FIGS. 5, 6, 7, and 8, respectively. The devices of FIGS. 5, 6, 7, and 8, such as devices 302, 304, 306, 307 and 308 of FIG. 3 are connected to interfaces 903 in a manner well known to those skilled in the art. Processor 901 controls these devices via interfaces 903 by executing routines stored in memory 902.

Interfaces routine 912 is executed by processor 901 to directly control the above noted devices via interfaces 903 based on decisions made by the other routines stored in memory 902.

Operating system 904 provides the overall control of computer 900 utilizing information stored in data 906.

Telecommunication control routine 907 controls the normal telecommunication operations of a telephone utilizing interfaces routine 912 and information stored in data 906.

The training operations as described in FIG. 15 or FIG. 16 are performed by training routine 909. Training routine 909 stores the identification of ears and individuals in ear identification database 908.

Ear identification routine 911 performs the operations as described with respect to FIGS. 10-13. Ear identification routine 911 utilizes the data stored in the ear identification database 908. In one embodiment, ear identification routine 911 does not utilize ear identification database 908 but only utilizes the differences in the two ears of the user during actual telephone use.

Motion/position detection routine 913 performs the operations as described with respect to FIG. 14.

Figure 10:
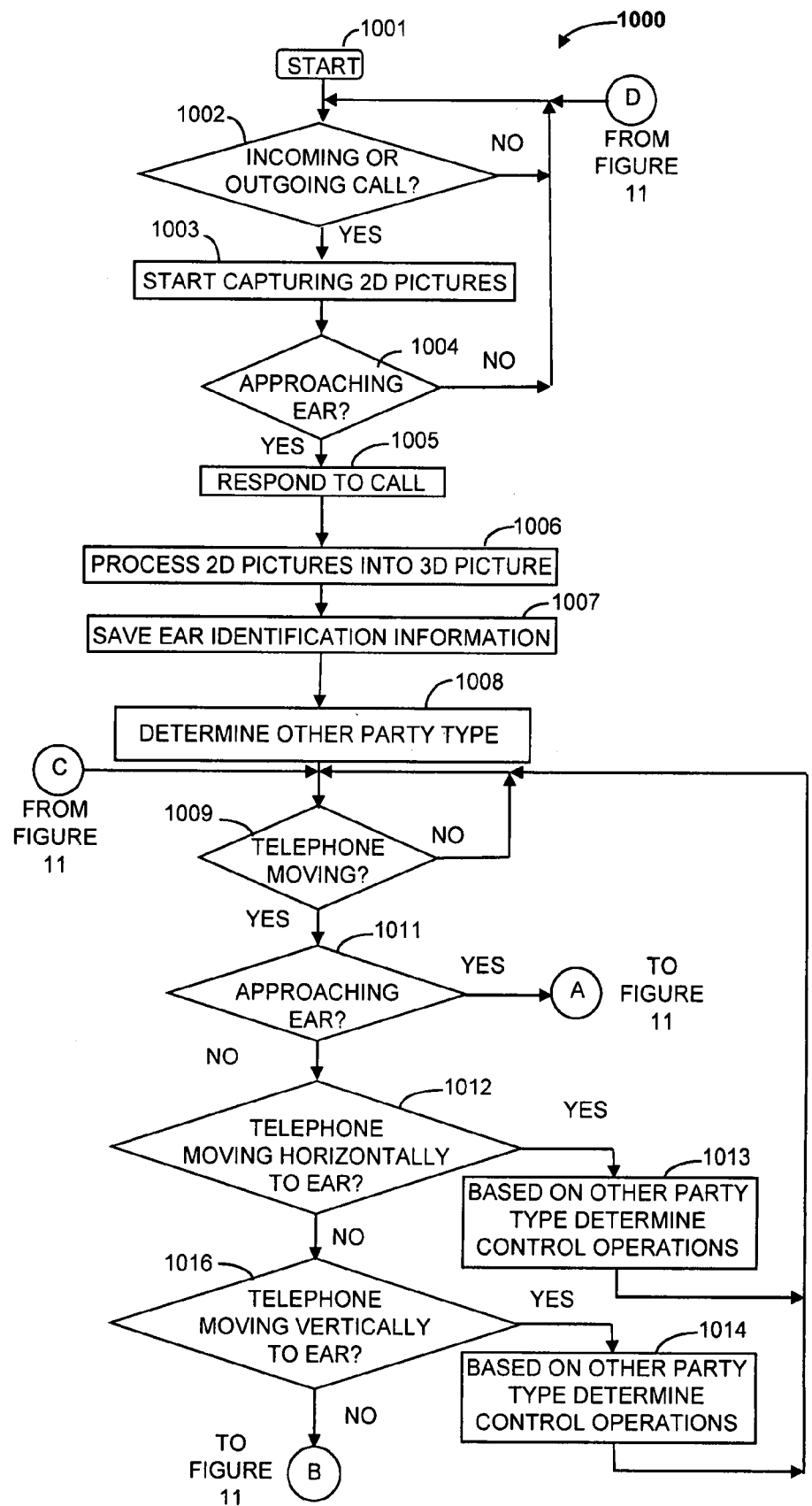

FIGS. 10 and 11 illustrates operations 1000 and 1100 for obtaining motion and position information utilizing visual techniques. After being started in block 1001, decision block 1002 determines if the telephone is receiving an incoming call or placing an outgoing call. If the answer is no, decision block 1002 is repeated.

If the answer in decision block 1002 is yes, block 1003 starts to capture 2-D pictures. By analyzing these pictures, decision block 1004 is able to determine when an ear is being approached by the telephone. If the answer in decision block 1004 is no, control is transferred back to decision block 1002. If the answer in decision block 1004 is yes, block 1005 responds to either the incoming or outgoing call before transferring control to block 1006.

Block 1006 processes 2-D pictures into 3-D pictures to obtain ear identification information, and then, block 1007 saves the ear identification information. Finally, block 1008 determines the other party type. It is important to know the type of party on the other end of the call in order to properly interpret the motion and position information. The type of party may be, but is not limited to, another telephone, a conferencing system, an operator, or a voice messaging system. Block 1008 and transfers control to decision block 1009.

Decision block 1009 determines if the telephone is moving. This determination can be made using visual techniques that determine the differences between sequences of the captured 2-D pictures or accelerators and/or gyroscopes could also be employed by the telephone. If the answer in decision block 1009 is no, decision block 1009 is re-executed. If the answer in decision block 1009 is yes, control is transferred to decision block 1011.

Decision block 1011 determines if the telephone is approaching an ear. This is found by examining the 2-D pictures for the presence of an ear that is increasing in size. If the answer in decision block 1011 is yes, control is transferred to block 1101 of FIG. 11. If the answer is no in decision block 1011, control is transferred to decision block 1012.

Decision block 1012 determines if the telephone is moving horizontally to the ear. This movement can be determined by utilizing a sequence of the 2-D pictures or by utilizing accelerometers and/or gyroscopes. Such a movement could indicate if the telephone was connected to a voice messaging system and that the user wanted to play the next message. If the answer is yes in decision block 1012, block 1013 determines the control operation based on the other party type such as a voice messaging system before transferring control back to decision block 1009.

If the answer in decision block 1012 is no, decision block 1016 determines if the telephone is moving in a vertical motion to the ear. This movement can also be determined by utilizing a sequence of 2-D pictures or by utilizing accelerometers and/or gyroscopes. Such a movement could indicate if the telephone was connected to a voice messaging system that the user wanted to delete the present message. If the answer in decision block 1016 is yes, control is transferred to block 1014. Block 1014 makes the determination of what the control operation should be based on the other party type before transferring control back to decision block 1009. If the answer in decision block 1016 is no, control is transferred to decision block 1106 of FIG. 11.

Returning to decision block 1011, if the answer in decision block 1011 is yes, control is transferred to block 1101. The latter block processes the 2-D pictures into 3-D pictures. Next, decision block 1102 determines if a different ear is being approached utilizing the ear identification information saved by block 1007. If the answer in decision block 1102 is yes, block 1103 determines the control operation based on the other party type. For example, if the other party type is another telephone and there is a second incoming call, the movement would indicate that the user wants to place the first call on hold and answer in the second call.

If the answer in decision block 1102 is no, block 1104 determines the control operation based on the other party type. For example, if the other party type is another telephone, the movement could indicate that the user wanted to place the call on hold. After execution of either block 1103 or 1104, control is transferred back to decision block 1009.

Returning to decision block 1016 of FIG. 10, if the answer in decision block 1016 is no, control is transferred to decision block 1106. The latter decision block determines if the telephone is stationary in front of the user's face. The 2-D pictures could be utilized to make this determination. If the answer is yes, block 1108 determines the control operation based on the party type before transferring control back to decision block 1009 of FIG. 10. For example, if the other party type is another telephone, the movement could indicate that the user wants to use the speaker phone function of the telephone.

If the answer in decision block 1106 is no, decision block 1109 determines if the call has been disconnected. This determination can be made using a number of visual, acceleration, position techniques. If the answer is no in decision block 1109, control is transferred back to decision block 1009. If the answer in decision block 1109 is yes, control is transferred back to decision block 1002.

Figure 12:
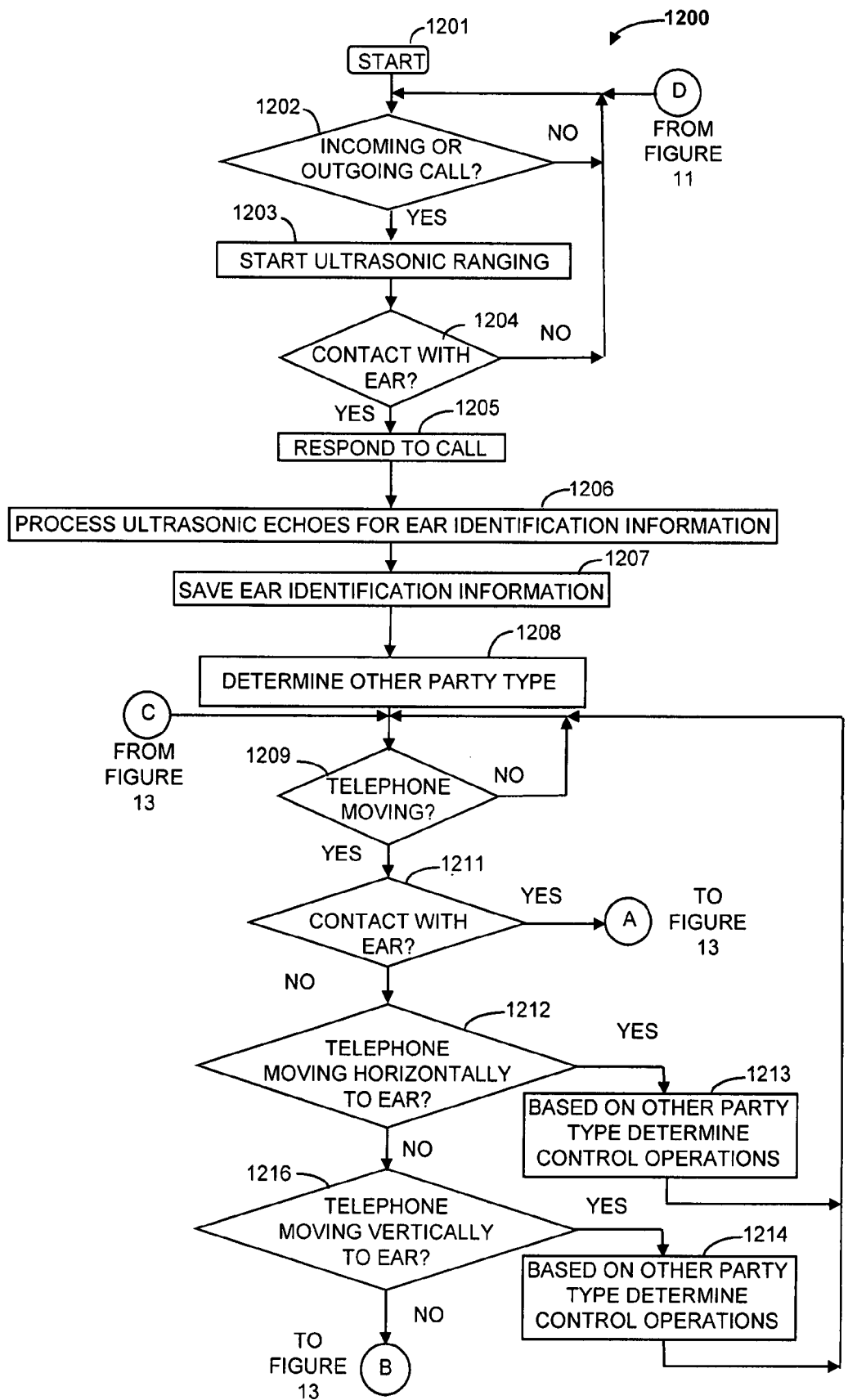

FIGS. 12 and 13 illustrates operations 1200 and 1300 for obtaining motion and position information utilizing sonic techniques. After being started in block 1201, decision block 1202 determines if the telephone is receiving an incoming call or placing an outgoing call. If the answer is no, decision block 1202 is repeated.

If the answer in decision block 1202 is yes, block 1203 starts to perform ultrasonic ranging to determine how far the telephone is from an object. Once, the ultrasonic ranging determines that the telephone is close to an object, the telephone uses ultrasonic reflections to determine if the object is an ear canal. At this point, the telephone is not trying to determine sufficient information to identify the ear but only to determine that the telephone is in contact with the ear canal. If the answer in decision block 1204 is no, control is transferred back to decision block 1202. If the answer in decision block 1204 is yes, block 1205 responds to either the incoming or outgoing call before transferring control to block 1206.

Block 1206 processes ultrasonic reflections of the ear canal for ear identification information, and then, block 1207 saves the ear identification information. Finally, block 1208 determines the other party type. It is important to know the type of party on the other end of the call in order to properly interpret the motion and position information. The type of party may be, but is not limited to, another telephone, a conferencing system, an operator, or a voice messaging system. Block 1208 and transfers control to decision block 1209.

Decision block 1209 determines if the telephone is moving. This determination can be made using the fact that the telephone is no longer in contact with an ear canal based on ultrasonic echoes and by utilizing ultrasonic ranging techniques or accelerators and/or gyroscopes could also be employed by the telephone. If the answer in decision block 1209 is no, decision block 1209 is re-executed. If the answer in decision block 1209 is yes, control is transferred to decision block 1211.

Decision block 1211 determines if the telephone is in contact with an ear. This is done by using ultrasonic ranging techniques and determining if an ear canal is in contact based on the ultrasonic echoes. If the answer in decision block 1211 is yes, control is transferred to block 1301 of FIG. 13. If the answer is no in decision block 1211, control is transferred to decision block 1212.

Decision block 1212 determines if the telephone is moving horizontally to the ear. This movement can be determined by utilizing ultrasonic ranging techniques since the ranging will indicate the presence and then the absence of the user's head or by utilizing accelerometers and/or gyroscopes. Such a movement could indicate if the telephone was connected to a voice messaging system that the user wants to play the next message. If the answer is yes in decision block 1212, block 1213 determines the control operation based on the other party type such as a voice messaging system before transferring control back to decision block 1209.

If the answer in decision block 1212 is no, decision block 1216 determines if the telephone is moving in a vertical motion to the ear. This movement can also be determined by utilizing ultrasonic ranging techniques or by utilizing accelerometers and/or gyroscopes. Such a movement could indicate if the telephone was connected to a voice messaging system and that the user wants to delete the present message. If the answer in decision block 1216 is yes, control is transferred to block 1214. Block 1214 makes the determination of what the control operation should be based on the other party type before transferring control back to decision block 1209. If the answer in decision block 1216 is no, control is transferred to decision block 1306 of FIG. 13.

Returning to decision block 1211, if the answer in decision block 1211 is yes, control is transferred to block 1301. The latter block processes the ultrasonic echoes from the ear canal to determine ear identification information. Next, decision block 1302 determines if a different ear is in contact utilizing the ear identification information saved by block 1207. If the answer in decision block 1302 is yes, block 1303 determines the control operation based on the other party type. For example, if the other party type is another telephone and there is a second incoming call, the movement would indicate that the user wants to place the first call on hold and answer in the second call.

If the answer in decision block 1302 is no, block 1304 determines the control operation based on the other party type. For example, if the other party type is another telephone, the movement could indicate that the user wanted to place the call on hold. After execution of either block 1303 or 1304, control is transferred back to decision block 1209.

Returning to decision block 1216 of FIG. 12, if the answer in decision block 1216 is no, control is transferred to decision block 1306. The latter decision block determines if the telephone is stationary and facing open space such as lying flat, pointed to the ceiling. The ultrasonic ranging could be utilized to make this determination. If the answer is yes, block 1308 determines the control operation based on the party type before transferring control back to decision block 1209 of FIG. 12. For example, if the other party type is another telephone, the movement could indicate that the user wants to use the speaker phone function of the telephone.

If the answer in decision block 1306 is no, decision block 1309 determines if the call has been disconnected. This determination can be made using a number of sonic, acceleration, position techniques. If the answer is no in decision block 1309, control is transferred back to decision block 1209. If the answer in decision block 1309 is yes, control is transferred back to decision block 1202.

FIG. 14, illustrates in flowchart form, operations 1400 that determine motion and position utilizing gyroscopes, position detectors, motion detectors, and contact detectors. Once started in 1401, decision block 1402 determines if the telephone is becoming active in an incoming or outgoing call. If the answer is no, decision block 1402 is re-executed. If the answer is yes, control is transferred to decision block 1403.

Decision block 1403 determines if the motion/position information indicates that the call should be responded to. If the answer is no, decision block 1403 is re-executed. If the answer is yes, control is transferred to block 1404 which responds to the call.

After execution of block 1404, block 1406 determines the other party type such as another telephone, a voice messaging system, an operator, or a conferencing system. Block 1406 then transfers control to decision block 1407. The latter decision block determines if the telephone is in motion. If the answer is no, decision block 1407 is re-executed. If the answer in decision block 1407 is yes, control is transferred to decision block 1408.

Decision block 1408 determines if the present motion and other party type indicate that a control operation should be performed. If the answer is yes, control is transferred to block 1409 that determines the control operation and performs the control operation before transferring control back to decision block 1407. If the answer in decision block 1408 is no, control is transferred to decision block 1411.

Decision block 1411 determines if the telephone is stationary. If the answer is no, control is transferred to decision block 1414. If the answer is yes in decision block 1411, control is transferred to decision block 1412.

Decision block 1412 determines if the stationary position and the other party type indicate a control operation. If the answer is yes, block 1413 determines the control operation and performs the control operation before transferring control back to decision block 1407. If the answer is no in decision block 1412, control is transferred to decision block 1414.

Decision block 1414 determines if the call has been disconnected. This determination can be performed by utilizing motion and position information. If the answer is no in decision block 1414, control is transferred back to decision block 1407. If the answer is yes in decision block 1414, control is transferred back to decision block 1402.

FIG. 15 illustrates, in flowchart form, operations 1500 that are performed by an embodiment to train a telephone for utilization of the visual technique for ear identification. After being started in block 1501, block 1502 obtains the identity of the individual and which ear is being tested. Note, there may be only one individual that is tested. In addition, block 1502 obtains the telephone configuration that is to be used with this ear. Computer 503 can use user interface 504 to obtain this information. Then, block 1503 requests that the individual start moving the telephone from the initial position towards the final position which is when the telephone is against the ear.

As the movement starts, blocks 1504-1509 attempt to store a predefined number of 3D pictures in the database for future use in identifying the ear and the individual. First, block 1504 captures a predefined number of 2D pictures, and block 1506 processes these 2D pictures into a 3D picture before transferring control to decision block 1507.

Decision block 1507 determines if the 3D picture is a valid ear picture since the telephone may be miss-pointed. If the answer is yes in decision block 1507, block 1508 stores the 3D picture in the ear identification database before transferring control to decision block 1509.

Decision block 1509 determines if a predefined number of 3D pictures have already been stored in the database. If the answer is no, control is transferred back to block 1504. If the answer in decision block 1509 is yes, control is transferred to block 1511 and the process is complete.

Returning to decision block 1507, if the answer in decision block 1507 is no, decision block 1512 determines if the invalid number of pictures that have been taken by the telephone exceeds a predefined number. If the answer is no, control is transferred back to block 1504. If the answer in decision block 1512 is yes, control is transferred to block 1513 which signals an error before transferring control to block 1511.

FIG. 16 illustrates, in flowchart form, operations 1600 that are performed by an embodiment to train a telephone for utilization of the sonic technique for ear identification. After being started in block 1601, block 1602 obtains the identity of the individual and which ear is being tested. Note, there may be only one individual that is tested. In addition, block 1602 obtains the telephone configuration that is to be used with this ear. Computer 603 can use user interface 604 of FIG. 4 to obtain this information. Then, block 1603 requests that the individual place the telephone close to the ear.

Next, decision block 1604 determines if the telephone is indeed close to the ear. If the answer is no in decision block 1604, control is transferred back to block 1603. If the answer is yes in decision block 1604, control is transferred to block 1606. The latter block obtains the sonic information by computer 603 utilizing transmitters section 418 before transferring control to decision block 1607.

Decision block 1607 determines if the sonic information obtained by block 1606 is valid. If the answer is yes in decision block 1607, block 1608 stores the sonic information in the database before transferring control to decision block 1609.

Decision block 1609 determines if predefined samples of sonic information have already been stored in the database. If the answer is no, control is transferred back to block 1606. If the answer in decision block 1609 is yes, control is transferred to block 1611 and the process is complete.

Returning to decision block 1607, if the answer in decision block 1607 is no, decision block 1612 determines if the invalid number of samples of sonic information that have been taken by the telephone exceeds a predefined number. If the answer is no, control is transferred back to block 1606. If the answer in decision block 1612 is yes, control is transferred to block 1613 which signals an error before transferring control to block 1611.

When the operations of a computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the computer is implemented in hardware, the telephone set, control computer or server can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for call control, comprising:
    obtaining initial biometric information of ears of a user of a handheld audio device;
    detecting a change in the biometric information of the ears of the user;
    determining a position of the handheld audio device by analyzing the detected change in biometric information; and
    performing call control based on the determined position wherein the call control is at least one of controlling an already established call from another handheld audio device, a voice messaging system, a conference call, or an operator.

2. The method of claim 1 further comprises determining motion of the handheld audio device by analyzing the detected change in biometric information; and
    the performing further performing call control based on the determined motion.

3. The method of claim 2 further comprises transmitting a message to the endpoint by the handheld audio device in response to the determined motion and position wherein the message requests an internal operation be performed by the endpoint without terminating communication with the handheld audio device wherein the endpoint is one of a voice messaging system, conferencing system, telephone operator, or other automated system.

4. The method of claim 1 wherein the obtaining and detecting comprise performing visual operations.

5. The method of claim 4 wherein the performing visual operations comprises gathering visual information of an ear; and
    comparing the gathered visual information with visual information stored in a database.

6. The method of claim 1 wherein the obtaining and detecting comprise performing sonic operations.

7. The method of claim 6 wherein the performing sonic operations comprises gathering sonic information from an ear canal of the ear; and
    comparing the gathered sonic information with sonic information stored in a database.

8. The method of claim 7 wherein gathering comprises transmitting ultrasonic signals into the ear canal; and
    analyzing reflected signals resulting from the transmitted ultrasonic signals for physical characteristics of the ear canal.

9. The method of claim 1 further comprises changing in response to determined position an operation to change the internal call control operations of the handheld audio device.

10. A handheld audio device, comprising:
    a computer for obtaining initial biometric information of ears of the user of the handheld device;
    the computer further detecting a change in the biometric information of the ears;
    the computer further determining a position of the handheld audio device by analyzing the detected change in biometric information; and
    the computer further performing call control based on the determined position wherein the call control is at least one of controlling an already established call from another handheld audio device, a voice messaging system, a conference call, or an operator.

11. The handheld audio device of claim 10 further comprises:
    the computer further determining motion of the handheld audio device by analyzing the detected change in biometric information; and the computer further performing call control based on the determined motion.

12. The handheld audio device of claim 11 further comprises:
    a ultrasonic transmitter for transmitting sonic signals into at least an ear canal of the ear of the user or a head of the user;
    a ultrasonic receiver for receiving reflected ultrasonic signals resulting from the transmitted ultrasonic signals from at least the ear canal or the head; and
    the computer further processing the reflected ultrasonic signals to determined motion and position of the handheld audio device.

13. The handheld device of claim 11 further comprises:
    an imaging module for obtaining digital images of at least an ear or head of the user; and
    the computer further processing the obtaining digital images to determine the motion and position of the handheld audio device.

14. A non-transitory computer-readable medium for call control, comprising computer-executable instructions configured for:
    computer-executable instructions for obtaining initial biometric information of ears of a user of a handheld audio device;
    computer-executable instructions for detecting a change in biometric information of the ears of the user,
    computer-executable instructions for determining a position of the handheld audio device by analyzing the detected change in biometric information; and computer-executable instructions for performing call control based on the determined position wherein the call control is at least one of controlling an already established call from another handheld audio device, a voice messaging system, a conference call, or an operator.

15. The non-transitory computer-readable medium of claim 14 further comprises computer-executable instructions for determining motion of the handheld audio device by analyzing the detected change in biometric information; and
the computer-executable instructions for performing further performing call control based on the determined motion.

16. The non-transitory computer-readable medium of claim 14 wherein the computer-executable instructions for obtaining and detecting comprise computer-executable instructions for performing visual operations.

17. The non-transitory computer-readable medium of claim 16 wherein the computer-executable instructions for performing visual operations comprise computer-executable instructions for gathering visual information of an ear; and
computer-executable instructions for comparing the gathered visual information with visual information stored in a database.

18. The non-transitory computer-readable medium of claim 14 wherein the computer-executable instructions for obtaining and detecting comprise computer-executable instructions for performing sonic operations.

19. The non-transitory computer-readable medium of claim 18 wherein the computer-executable instructions for performing sonic operations comprise computer-executable instructions for gathering sonic information from an ear canal of the ear; and
computer-executable instructions for comparing the gathered sonic information with sonic information stored in a database.

20. The non-transitory computer-readable medium of claim 19 wherein computer-executable instructions for gathering comprise computer-executable instructions for transmitting ultrasonic signals into the ear canal; and
computer-executable instructions for analyzing reflected signals resulting from the transmitted ultrasonic signals for physical characteristics of the ear canal.

21. The non-transitory computer-readable medium of claim 14 wherein the call control is at least one of controlling a call from another telephone, a voice messaging system, a conference call, or an operator.

* * * * *